United States Patent
Keshwani et al.

(10) Patent No.: US 12,411,642 B2
(45) Date of Patent: Sep. 9, 2025

(54) ENHANCEMENT OF MULTIPLE MONITOR DISPLAY CAPABILITIES

(71) Applicant: DELL PRODUCTS L.P., Round Rock, TX (US)

(72) Inventors: Anup Keshwani, Bangalore (IN); Shuzhi Liu, Chaoyang (CN); Fu Gao Lv, Beijing (CN)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 18/361,853

(22) Filed: Jul. 30, 2023

(65) Prior Publication Data
US 2025/0036343 A1    Jan. 30, 2025

(51) Int. Cl.
G06F 3/14    (2006.01)
G06T 1/60    (2006.01)
G09G 5/39    (2006.01)

(52) U.S. Cl.
CPC .............. G06F 3/1431 (2013.01); G06T 1/60 (2013.01); G09G 5/39 (2013.01)

(58) Field of Classification Search
CPC . G06T 1/20; G06T 1/60; G06F 3/1423; G06F 3/1431; G06F 3/1438; G09G 5/39; G09G 5/363; G09G 5/393; G09G 5/395; G09G 2360/18
USPC ................................................. 345/520, 545
See application file for complete search history.

(56) References Cited

U.S. PATENT DOCUMENTS

| | | | |
|---|---|---|---|
| 6,970,173 B2 * | 11/2005 | Ciolac ..................... | G09G 5/14 345/545 |
| 10,235,740 B2 * | 3/2019 | Kamepalli ................ | G06T 1/20 |
| 10,437,637 B1 * | 10/2019 | Koneru ..................... | G06F 8/44 |
| 10,997,687 B1 | 5/2021 | Guerra et al. | |
| 2010/0321395 A1 * | 12/2010 | Maciesowicz ........... | G06F 3/14 345/545 |
| 2011/0090234 A1 * | 4/2011 | Bolcsfoldi ............... | G09F 9/35 345/536 |
| 2020/0302894 A1 | 9/2020 | Khen et al. | |

* cited by examiner

*Primary Examiner* — Jacinta M Crawford
(74) *Attorney, Agent, or Firm* — Larson Newman, LLP

(57) ABSTRACT

An information handling system includes first and second graphics processing units, and a processor. The first graphics processing unit includes first, second, and third display ports. The second graphics processing unit includes fourth, fifth, and sixth display ports. The processor receive a buffer request that identifies a number of frame buffers to be created. The processor call a graphics multiple buffer render create buffer command to divide a graphics multiple buffer render buffer into multiple buffers. The multiple buffers of the graphics multiple buffer render buffer are based on the number of frame buffers identified in the buffer request. The processor create multiple frame buffers. The number of the frame buffers is the same as a number of the buffers of the graphics multiple buffer render buffer. Each of the frame buffers provide data to a different one of the first, second, third, fourth, fifth, and sixth display ports.

20 Claims, 5 Drawing Sheets

ENHANCEMENT OF MULTIPLE MONITOR DISPLAY CAPABILITIES

FIELD OF THE DISCLOSURE

The present disclosure generally relates to information handling systems, and more particularly relates to an enhancement of multiple monitor display capabilities.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes first and second graphics processing units, and a processor. The first graphics processing unit includes first, second, and third display ports. The second graphics processing unit includes fourth, fifth, and sixth display ports. The processor may communicate with both the first graphics processing unit and with the second graphics processing unit. The processor may receive a buffer request that identifies a number of frame buffers to be created. The processor may call a graphics multiple buffer render create buffer command to divide a graphics multiple buffer render buffer into multiple buffers. The multiple buffers of the graphics multiple buffer render buffer are based on the number of frame buffers identified in the buffer request. The processor may create multiple frame buffers. The number of the frame buffers is the same as a number of the buffers of the graphics multiple buffer render buffer. Each of the frame buffers provide data to a different one of the first, second, third, fourth, fifth, and sixth display ports.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
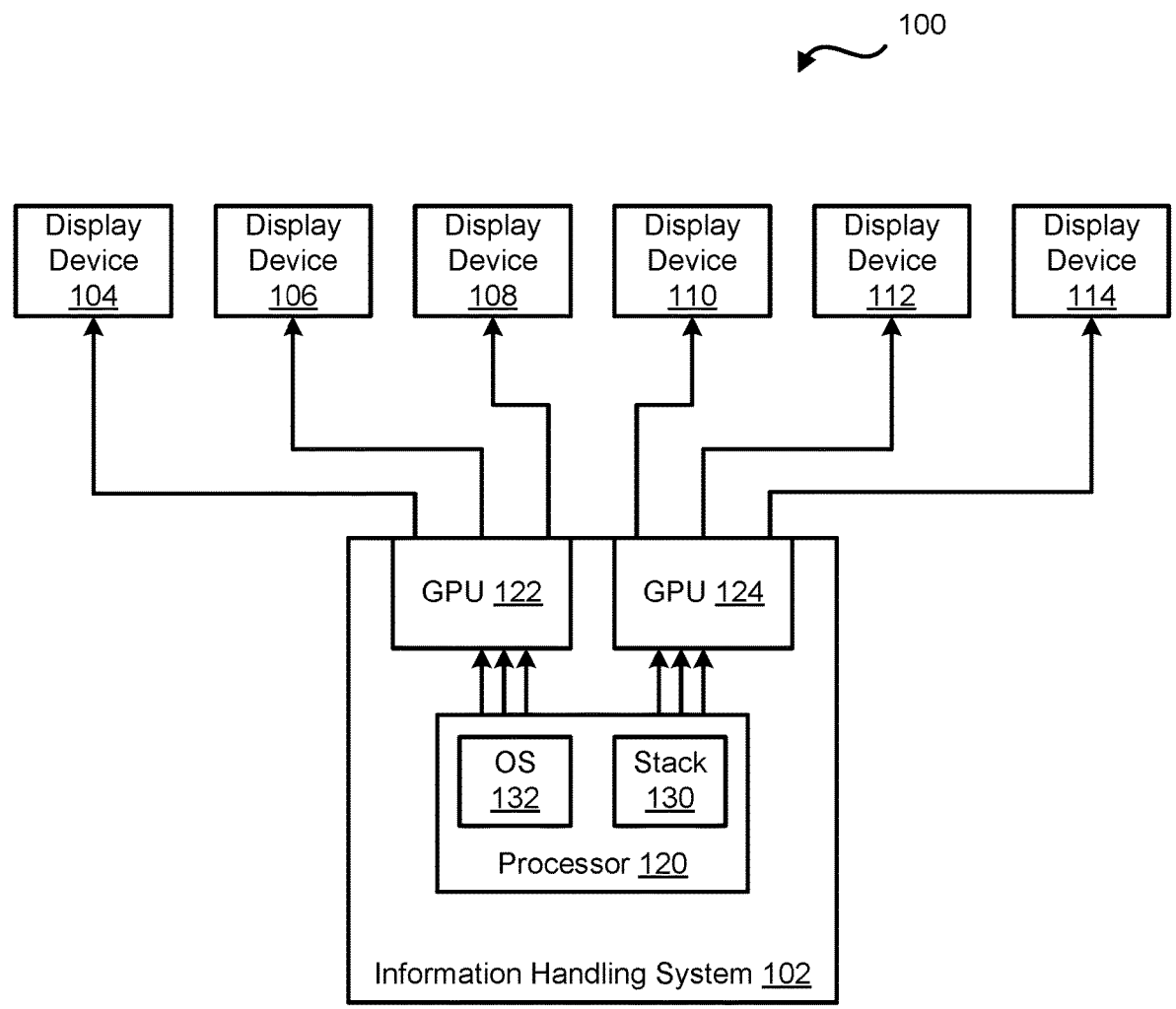
FIG. 1 is a block diagram of a system including an information handling system and multiple monitors according to at least one embodiment of the present disclosure.

FIG. 1 illustrates a system 100 including an information handling system 102 and multiple monitors or display devices 104, 106, 108, 110, 112, and 114 (display devices 104-114) according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 is in physical communication with display devices 104-114. Information handling system 102 includes a processor 120 and graphics processing units (GPUs) 122 and 124. Processor 120 includes multiple components including, but not limited to, a software stack 130 and an operating system (OS) 132. In an example, code associated with software stack 130 and OS 132 may be stored within a memory internal to processor 120 or in a memory external to the processor, such as memory 520 or 525 of FIG. 5. In certain examples, GPUs 122 and 124 may have any suitable number of display ports and each display port may communicate with and provide rendering data to a different one of display devices 104-114. For example, GPU 122 may include one display port to communicate with display device 104, another display port to communicate with display device 106, and even another display port to communicate with display device 108. Similarly, GPU 124 may include one display port to communicate with display device 110, another display port to communicate with display device 112, and even another display port to communicate with display device 114. Information handling system 102 may include any suitable number of additional components without varying from the scope of this disclosure.

In previous information handling systems, the size of GPU memories may limit a maximum window size created by applications. In these information handling systems, the memory limitation may be represented as a maximum texture size, such as 16384 ($2^{14}$) pixels. Based on this maximum texture size, the maximum buffer allocation may be 1 GB. A display device with 4k resolution has a pixel width of 3840. Based on the pixel width of 4k display devices, a maximum texture size of 16384 may only support four complete 4k display devices. Information handling system 102 may be improved by increasing buffer memory capacity to support more than four 4k display devices. Information handling system 100 may be further improved by processor 120 leveraging a maximum number of display ports that GPUs 122 and 124 may support. Also, processor 120 may dynamically detect and utilize the maximum number of display ports that GPUs 122 and 124 may support. Components of stack 130 and OS 132 will be described with respect to FIG. 2.

Figure 2:
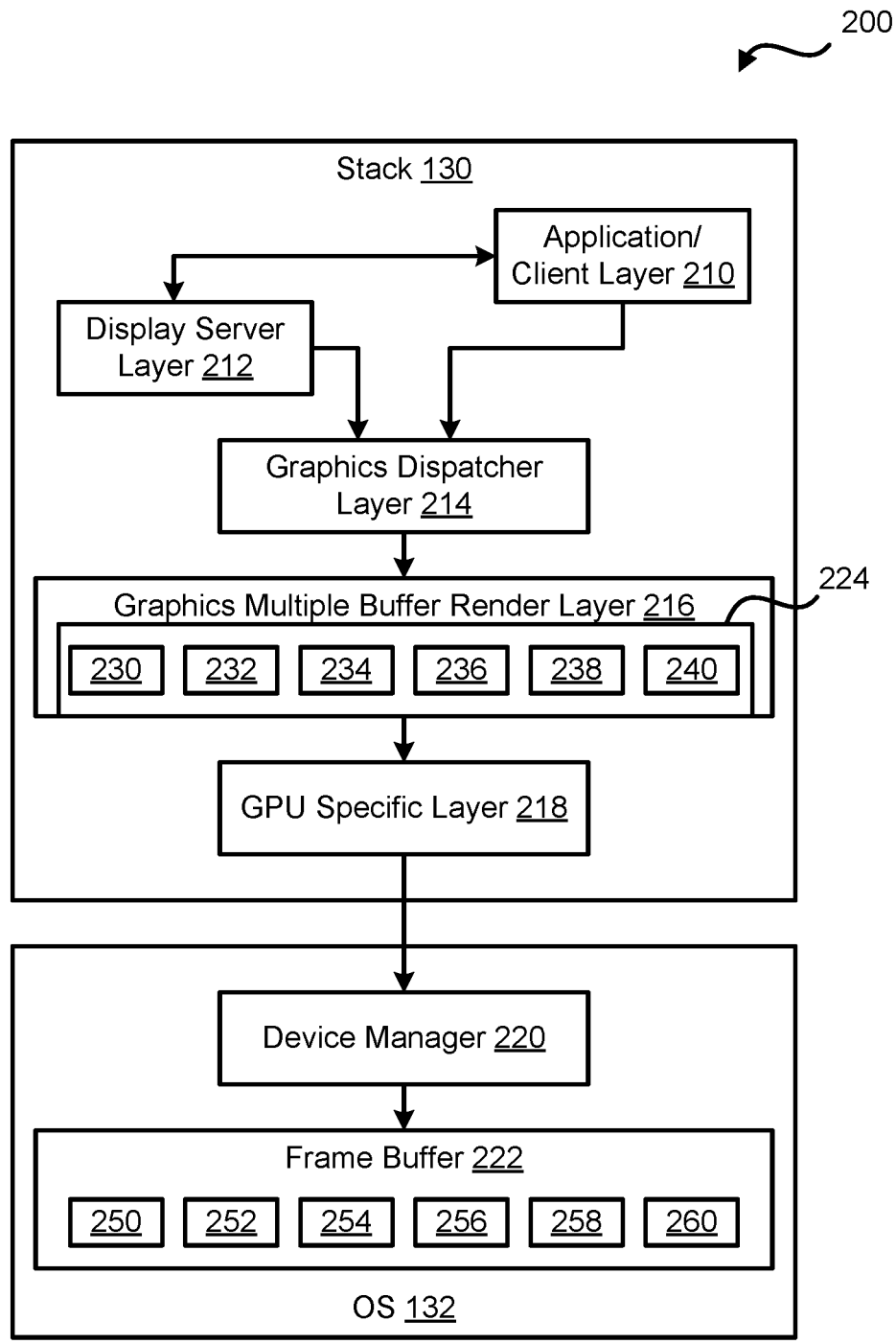
FIG. 2 is a block diagram of a software stack and operating system for an information handling system according to at least one embodiment of the present disclosure.

FIG. 2 illustrates software stack 130 and OS 132 according to at least one embodiment of the present disclosure. Stack 130 includes an application/client layer 210, a display server layer 212, a graphics dispatcher layer 214, a graphic multiple buffer render (GMBR) layer 216, and a GPU specific layer 218. OS 132 includes a device manager 220 and a frame buffer 222. Stack 130 and OS 132 may both include any suitable number of additional components without varying from the scope of this disclosure.

In an example, processor 120 of FIG. 1 may perform any of the operations described with respect to components of stack 130, such as application/client layer 210, display server layer 212, graphics dispatcher layer 214, graphic multiple buffer render (GMBR) layer 216, and GPU specific layer 218. Additionally, processor 120 of FIG. 1 may perform any of the operations described with respect to components of OS 132 including, but not limited to, device manager 220 and frame buffer 222. Operations described with respect to application/client layer 210, display server layer 212, graphics dispatcher layer 214, graphic multiple buffer render (GMBR) layer 216, GPU specific layer 218, device manager 220, and frame buffer 222 may be understood to be performed by processor 120, GPU 122, or GPU 124. The operations of components within information handling system 102 will be described with respect to FIGS. 1 and 2.

During an initialization of information handling system 102, GMBR layer 216 may detect details associated with display devices 104-114. In an example, the details associated with display devices 104-114 may include, but are not limited to, the number of display devices and a resolution for each of the display devices. In an example, processor 120, via application/client layer 210, may request an OS buffer to be created. In certain examples, application layer 210 provide the buffer creation request to graphics dispatcher layer 214 in any suitable manner. For example, application layer 210 may provide the buffer creation request directly to graphics dispatcher layer 214 or may provide the request to the graphics dispatcher layer via display server layer 212. In certain examples, the buffer creation request or call may include data identifying a number of buffers to create. The number of buffers may be based on a number of display devices 104-414 to have data provided to and the resolution of the display displays. For example, the create buffer call may indicate any suitable number of display devices, such as six, seven, eight, nine, or the like, and may indicate that the resolution for each of the display devices is a 4k resolution. In an example, components, such as OS 204 and graphics dispatcher layer 214, may already have data identifying GMBR layer 216.

In an example, graphics dispatcher layer 214 may provide a create buffer call to GMBR layer 216. In response to the create buffer call, GMBR layer 216 may provide a create buffer call to GPUs 122 and 124. In an example, GMBR layer 216 may determine a number of buffers to create based on the GMBR create buffer call relayed through graphics dispatcher layer 214. At operation 332, GMBR layer 216 may utilize a create buffer loop to create the number of buffers identified in the GMBR create buffer call. In certain examples, GMBR layer 216 may divide a GMBR buffer 224 into multiple subset buffers, such as buffers 230, 232, 234, 236, 238, and 240. In an example, the number of subset buffers created within GMBR buffer 224 may be equal to the number of display devices. For example, information handling system 102 is in communication with six display devices 104-114 and GMBR layer 216 may create six buffers 230, 232, 234, 236, 238, and 240 within GMBR buffer 224. In an example, GMBR layer 216 may utilize a loop operation to create the number of buffers by dividing a single GMBR buffer 224 into multiple smaller buffers 230, 232, 234, 236, 238, and 240.

After the multiple GMBR buffers 230, 232, 234, 236, 238, and 240 have been created, GMBR layer 216 returns a GMBR logic buffer object to application/client layer 210. During application/client layer 210 may provide a render API call to graphics dispatcher layer 214. Based on the render API call, graphics dispatcher layer 214 provides a GMBR function call to GMBR layer 216. In an example, GMBR layer 216 may determine whether a buffer management logic should be performed based on a number of display devices connected to information handling system 102. If the number of display devices 104-114 is less than a predetermined number of devices, such as four display devices, the buffer management logic does not need to be performed. Based on buffer management logic not needing to be performed, GMBR layer 216 may call GPU specific layer 218 to create a corresponding frame buffer, such as frame buffer 222.

If the number of display devices 104-114 is more than the predetermined number of devices, the buffer management logic does need to be performed. In an example, the GMBR layer 216 may identify the number of frame buffers to be created for GPUs 122 and 124. GMBR layer 216 may utilize a create buffer loop to create the number of frame buffers, such as frame buffers 250, 252, 254, 256, 258, and 260, identified in the create frame buffer call. In an example, the frame buffers may be created by dividing frame buffer 222 into multiple smaller frame buffers 250, 252, 254, 256, 258, and 260. In certain examples, frame buffers 250, 252, and 254 may be associated with GPU 122, and frame buffers 256, 258, and 260 may be associated with GPU 124.

Based on the multiple buffers 250, 252, 254, 256, 258, and 260, each of GPUs 122 and 124 may render images on three different display devices and rendered images may have 4k resolution. In an example, GPU 122 may render data from buffer 250 as an image on display device 104, may render data from buffer 252 as an image on display device 106, and may render data from buffer 254 as an image on display device 108. Similarly, GPU 124 may render data from buffer 256 as an image on display device 110, may render data from buffer 258 as an image on display device 112, and may render data from buffer 260 as an image on display device 114.

Figure 3:
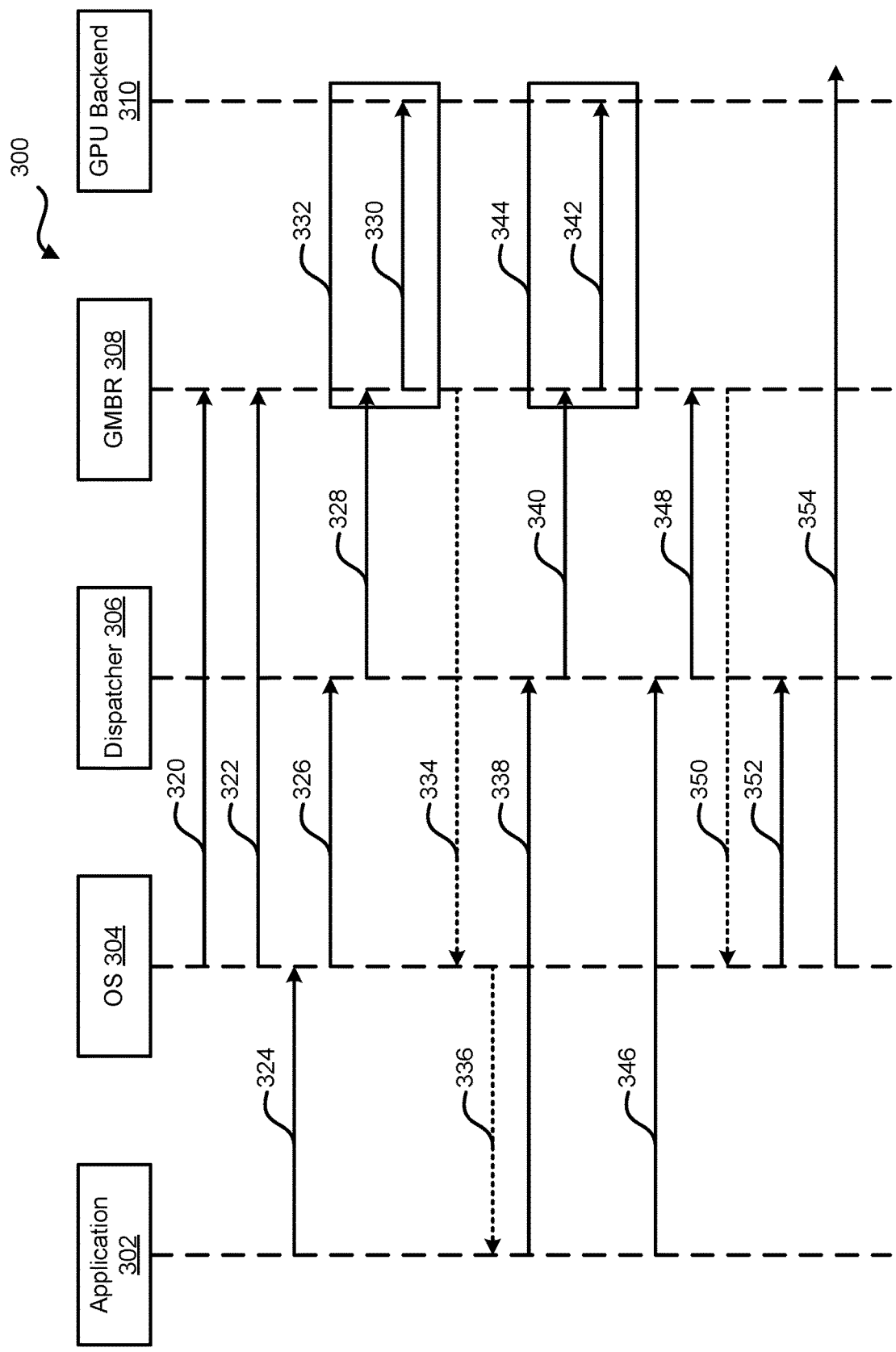
FIG. 3 is a flow diagram of a method for creating multiple frame buffers for high resolution display on multiple display devices according to at least one embodiment of the present disclosure.

FIG. 3 is a flow diagram of a method 300 for creating multiple frame buffers for high resolution display on multiple display devices according to at least one embodiment of the present disclosure. The operations of method 300 are performed by an application 302, an operating system (OS) 304, a dispatcher 306, a graphics multiple buffer render (GMBR) 308, and a graphics processing unit backend 310. In an example, application 302, OS 304, dispatcher 306, and GMBR 308 may be executed by a processor of an information handling system. It will be readily appreciated that not every operation set forth in this flow diagram is always necessary, and that certain operations of the methods may be combined, performed simultaneously, in a different order, or perhaps omitted, without varying from the scope of the disclosure.

At operation 320, OS 304 detects GMBR 308. In response to the detection of GMBR 308, OS 304 may provide a request to synchronize monitor or display device layout information at operation 322. At operation 324, application 302 may provide a window buffer request to OS 304. In an example, the buffer request may be associated with a render buffer to provide data to one or more display devices, such as display devices 104-114 of FIG. 1, for providing image on the display screens. In certain examples, operations by application 302 may not change after the buffer request, and OS 304 may own or control operations of the render buffer.

At operation 326, OS 304 may provide a create buffer call to dispatcher 306. In certain examples, the create buffer call may include data identifying a number of buffers to create. The number of buffers may be based on a number of display devices to have data provided to and the resolution of the display displays. For example, the create buffer call may indicate any suitable number of display devices, such as six, seven, eight, nine, or the like, and may indicate that the resolution for each of the display devices is a 4k resolution. In an example, components, such as OS 304 and dispatcher 306, may already have data identifying GMBR 308.

Based on the prior identification of GMBR 308, dispatcher 306 may provide a create buffer call to GMBR 306 at operation 328. In response to the create buffer call, GMBR 306 may provide a create buffer call to GPU backend 310 at operation 330. In an example, GMBR 308 may determine a number of buffers to create based on the GMBR create buffer call relayed from OS 304 through dispatcher 306. At operation 332, GMBR 308 may utilize a create buffer loop to create the number of buffers identified in the GMBR create buffer call. In certain examples, the number of buffers created may be substantially equal to the number of display devices, such as display devices 104-114 of FIG. 1, in communication with the information handling system. In an example, multiple operations 330 within loop operation 332 may create the number of buffers by dividing a single GMBR buffer into multiple smaller buffers. In certain examples, GMBR 308 and the multiple GMBR buffers may be part of a software stack for a processor of the information handling system.

After the multiple GMBR buffers have been created, GMBR 308 returns a GMBR logic buffer object at operation 334. In an example, the GMBR logic buffer object may include any suitable data associated with the multiple GMBR buffers created during the multiple iterations of operation 330. At operation 336, OS 304 returns or provides the identities of the create GMBR buffers to application 302. At operation 338, application 302 provides a render API call to dispatcher 306. Based on the render API call, dispatcher 306 provides a GMBR function call to GMBR 308 at operation 340. In an example, the GMBR function may identify the number of frame buffers to be created for one or more GPUs. At operation 342, GMBR 308 creates a frame buffer. At operation 344, GMBR 308 may utilize a create buffer loop to create the number of frame buffers identified in the create frame buffer call. In an example, the frame buffers may be created by dividing a single large frame buffer into multiple smaller frame buffers.

At operation 346, application 302 performs a swap buffer action, and provide the swap buffer action to dispatcher 306. In an example, the swap buffer action may be performed at any suitable time including, but not limited to, after a first one of the GMBR buffers has rendered the data to the corresponding frame buffer, and additional data is to be written to another GMBR buffer. At operation 348, dispatcher 306 provides the swap buffer request to GMBR 308, which in turn may provide the data to a frame buffer corresponding to a currently selected GMBR buffer. At block 350, GMBR 308 notifies OS 304 that the current GMBR buffer is committed to a particular frame buffer. At operation 352, OS 304 renders the data from the GMBR buffer of the software stack to a corresponding frame buffer. At block 354, the frame buffer provides the data to a display device or monitor. In an example, the data may be provided to the display device via a device manager.

Figure 4:
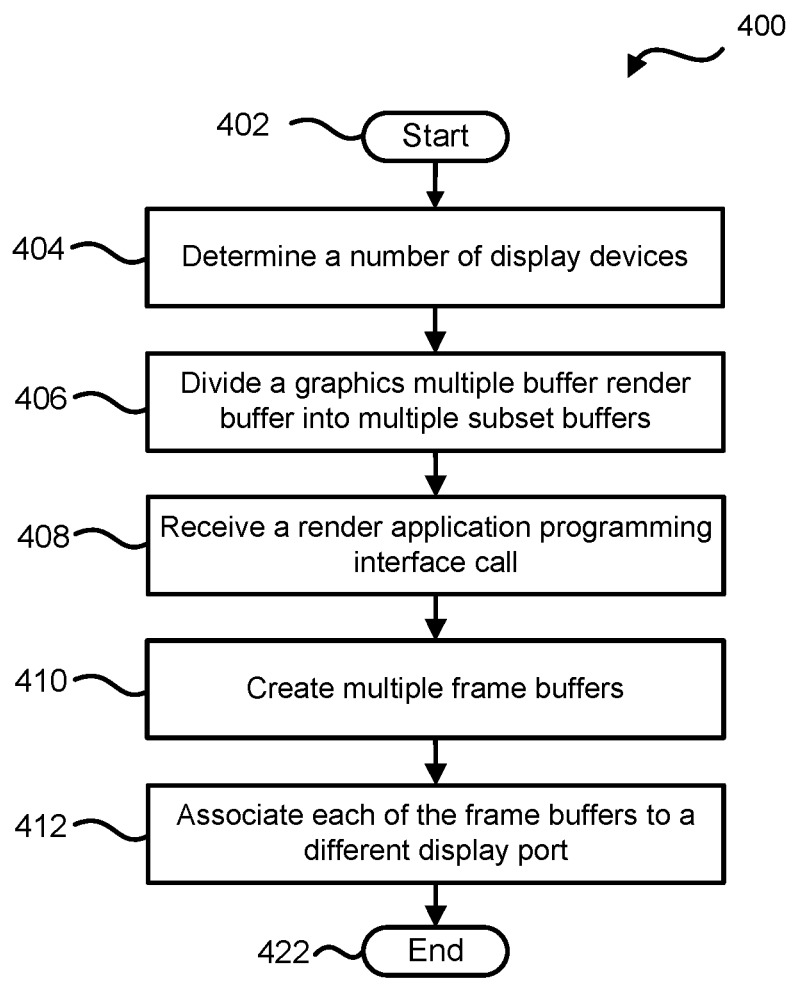
FIG. 4 is a flow diagram of a method for creating multiple frame buffers in an information handling system according to at least one embodiment of the present disclosure.

FIG. 4 illustrates a flow of a method 400 for creating multiple frame buffers in an information handling system according to at least one embodiment of the present disclosure, starting at block 402. In an example, method 400 may be performed by any suitable component including, but not limited to, processor 120 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, a number of display devices in communication with an information handling system is determined. In an example, each display device may be in communication with the information handling system via a different display port. The number of display ports in each GPU of the information handling system may be determine or detected. In certain examples, a first group of the display ports, such as three display ports, are within a first GPU and a second group of the display ports, such as three display ports, are within a second GPU. In an example, a resolution of the output of each of the display ports is determined, such as a 4k resolution.

At block 406, a GMBR buffer is divided into multiple subset buffers. In an example, a number of the subset of buffers in the GNBR buffer is based on the number of display devices in communication with the information handling system. At block 408 a render application programming interface (API) call to request a buffer object is received. Based on the render API call, a buffer position and size for a frame buffer is calculated.

At block 410 multiple frame buffers are created based on the render API call. The frame buffers are physical buffers within the information handling system. In an example, the frame buffers may be created by dividing a single large frame buffer into multiple smaller frame buffers. In certain examples, a number of the frame buffers created may be the same as the number of the buffers of the GMBR buffer. At block 412, each of the multiple frame buffers is associated with a different display port of the GPUs of the information handling system, and the flow ends at block 414. Each of the frame buffers may provide data to a different one of display ports in the GPUs of the information handling system.

Figure 5:
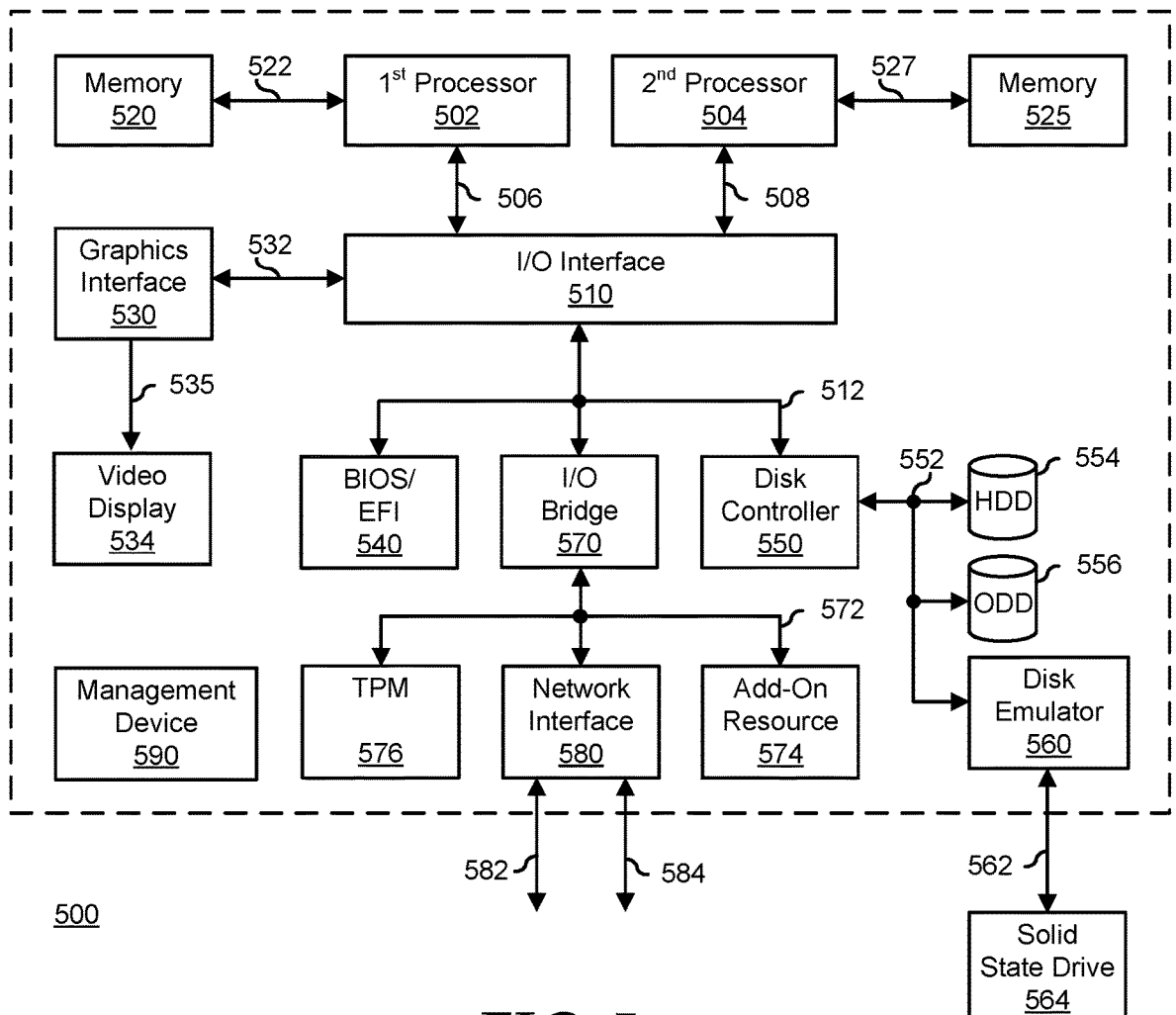
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first graphics processing unit including first, second, and third display ports;
   a second graphics processing unit including fourth, fifth, and sixth display ports; and
   a processor to communicate with both the first graphics processing unit and with the second graphics processing unit, the processor to:
      receive a buffer request, wherein the buffer request identifies a number of frame buffers to be created;
      call a graphics multiple buffer render create buffer command to divide a graphics multiple buffer render buffer into a plurality of buffers, wherein the buffers of the graphics multiple buffer render buffer are based on the number of frame buffers identified in the buffer request;
      determine a number of display devices connected to the information handling system;
      in response to the number of display devices being below a threshold number of display devices, create a plurality of frame buffers, wherein a number of the frame buffers is the same as a number of the buffers of the graphics multiple buffer render buffer, wherein each of the frame buffers provides data to a different one of the first, second, third, fourth, fifth, and sixth display ports; and
      in response to the number of display devices being above threshold number of display devices, perform a buffer management logic prior to the plurality of frame buffers being created.

2. The information handling system of claim 1, wherein the processor to: wherein the number of the frame buffers is the same as the number of display devices.

3. The information handling system of claim 1, wherein the reception of the buffer request includes the processor to: receive a render application programming interface call to request a buffer object.

4. The information handling system of claim 1, wherein the processor further to:
   calculate a buffer position and size; and
   create the number of the buffers of the graphics multiple buffer render buffer.

5. The information handling system of claim 1, wherein the processor further to: detect an output resolution for each of the of the first, second, third, fourth, fifth, and sixth display ports.

6. The information handling system of claim 1, wherein the processor further to: detect a number of display ports in both the first and second graphics processing units.

7. The information handling system of claim 1, wherein the frame buffers are physical buffers within the information handling system.

8. The information handling system of claim 1, wherein each of the first, second, third, fourth, fifth, and sixth display ports outputs 4k resolution data.

9. A method comprising:
receiving, by a processor of an information handling system, a buffer request, wherein the buffer request identifies a number of frame buffers to be created;
calling, by the processor, a graphics multiple buffer render create buffer command to divide a graphics multiple buffer render buffer into a plurality of buffers, wherein the buffers of the graphics multiple buffer render buffer are based on the number of frame buffers identified in the buffer request;
determine a number of display devices connected to the information handling system;
in response to the number of display devices being below a threshold number of display devices, creating a plurality of frame buffers, wherein a number of the frame buffers is the same as a number of the buffers of the graphics multiple buffer render buffer, wherein each of the frame buffers provides data to a different one of first, second, third, fourth, fifth, and sixth display ports in first and second graphics processing units of the information handling system; and
in response to the number of display devices being above threshold number of display devices, performing a buffer management logic prior to the plurality of frame buffers being created.

10. The method of claim 9, further comprising: wherein the number of the frame buffers is the same as the number of display devices.

11. The method of claim 9, wherein the receiving of the buffer request, includes the method further comprising: receiving a render application programming interface call to request a buffer object.

12. The method of claim 9, further comprising:
calculating a buffer position and size; and
creating the number of the buffers of the graphics multiple buffer render buffer.

13. The method of claim 9, further comprising: detecting an output resolution for each of the of the first, second, third, fourth, fifth, and sixth display ports.

14. The method of claim 9, further comprising: detecting a number of display ports in both the first and second graphics processing units.

15. The method of claim 9, wherein the frame buffers are physical buffers within the information handling system.

16. The method of claim 9, wherein each of the first, second, third, fourth, fifth, and sixth display ports outputs 4k resolution data.

17. An information handling system comprising:
a first graphics processing unit including first, second, and third display ports;
a second graphics processing unit including fourth, fifth, and sixth display ports; and
a processor to communicate with both the first graphics processing unit and with the second graphics processing unit, the processor to:
determine a number of display devices in communication with the first and second graphics processing units;
receive a buffer request, wherein the buffer request identifies a number of frame buffers to be created, wherein the number of the frame buffers to be created is the same as the number of display devices;
calculate a buffer position and size of a graphics multiple buffer render buffer;
call a graphics multiple buffer render create buffer command to divide the graphics multiple buffer render buffer into a plurality of buffers, wherein the buffers of the graphics multiple buffer render buffer are based on the number of frame buffers identified in the buffer request; and
determine a number of display devices connected to the information handling system;
in response to the number of display devices being below a threshold number of display devices, create a plurality of frame buffers, wherein a number of the frame buffers is the same as a number of the buffers of the graphics multiple buffer render buffer, wherein each of the frame buffers provides data to a different one of the first, second, third, fourth, fifth, and sixth display ports; and
in response to the number of display devices being above threshold number of display devices, perform a buffer management logic prior to the plurality of frame buffers being created.

18. The information handling system of claim 17, wherein the processor further to: detect an output resolution for each of the of the first, second, third, fourth, fifth, and sixth display ports.

19. The information handling system of claim 17, wherein the frame buffers are physical buffers within the information handling system.

20. The information handling system of claim 17, wherein each of the first, second, third, fourth, fifth, and sixth display ports outputs 4k resolution data.

* * * * *